United States Patent
McKee et al.

(10) Patent No.: US 10,088,172 B2
(45) Date of Patent: Oct. 2, 2018

(54) OVEN USING STRUCTURED AIR

(71) Applicant: Alto-Shaam, Inc., Menomonee Falls, WI (US)

(72) Inventors: Philip R. McKee, Frisco, TX (US); Lee Thomas VanLanen, McKinney, TX (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 132 days.

(21) Appl. No.: 15/224,319

(22) Filed: Jul. 29, 2016

(65) Prior Publication Data
US 2018/0031250 A1    Feb. 1, 2018

(51) Int. Cl.
*F24C 15/32*    (2006.01)

(52) U.S. Cl.
CPC .................................. *F24C 15/322* (2013.01)

(58) Field of Classification Search
CPC .................................. A21B 1/26; F24C 15/322
USPC .............................. 126/21 A, 39 D; 219/400
See application file for complete search history.

(56) References Cited

U.S. PATENT DOCUMENTS

| | | | |
|---|---|---|---|
| 1,527,020 A | 2/1925 | Valliant | |
| 2,098,296 A | 11/1937 | Kettering et al. | |
| 2,214,630 A | 9/1940 | Wheeler | |
| 2,234,173 A * | 3/1941 | Hughes | C10B 15/02 202/102 |
| 2,305,056 A | 12/1942 | Austin | |
| 2,491,687 A | 12/1949 | Nutt | |
| 2,513,846 A | 7/1950 | Collins | |
| 2,715,898 A | 8/1955 | Michaelis et al. | |
| 2,940,381 A | 6/1960 | Cottongim et al. | |
| 3,221,729 A | 12/1965 | Beasley et al. | |
| 3,232,072 A | 2/1966 | Barroero | |
| 3,304,406 A | 2/1967 | King | |
| 3,318,299 A | 5/1967 | Lewis | |
| 3,326,201 A | 6/1967 | Murray | |
| 3,335,499 A | 8/1967 | Larsson | |
| 3,514,576 A | 5/1970 | Hilton et al. | |
| 3,538,904 A | 11/1970 | Baker | |
| 3,568,590 A | 3/1971 | Grice | |

(Continued)

FOREIGN PATENT DOCUMENTS

| | | |
|---|---|---|
| EP | 0002784 A1 | 7/1979 |
| EP | 1672284 A1 | 6/2006 |

(Continued)

OTHER PUBLICATIONS

US 5,346,923, 09/1994, Luebke et al. (withdrawn)

*Primary Examiner* — Avinash Savani
(74) *Attorney, Agent, or Firm* — Boyle Fredrickson S.C.

(57) ABSTRACT

A jet plate for directing a flow of air into a cooking cavity of an oven may comprise a body configured to be disposed along a top wall or a bottom wall of the cooking cavity, and one or more structured air inlets that are openings through the body. Each of the structured air inlets comprises holes and slots that are alternatingly arranged and serially connected. The structured air inlets enable air to be introduced into the cooking cavity in a structured formation to improve cooking speed and cooking efficiency. In addition, structured air inlets in a jet plate may be configured in various manners to address unevenness in the distribution of air flow within the cooking cavity.

54 Claims, 9 Drawing Sheets

(56) References Cited

U.S. PATENT DOCUMENTS

| | | |
|---|---|---|
| 3,658,047 A | 4/1972 | Happel |
| 3,789,516 A | 2/1974 | Schraft et al. |
| 3,828,760 A | 8/1974 | Farber et al. |
| 3,884,213 A | 5/1975 | Smith |
| 3,908,533 A | 9/1975 | Fagerstrom et al. |
| 3,935,809 A | 2/1976 | Bauer |
| 3,946,651 A | 3/1976 | Garcia |
| 3,973,551 A * | 8/1976 | Caselani .............. A21B 1/28 126/21 A |
| 4,038,968 A | 8/1977 | Rovell |
| 4,110,916 A | 9/1978 | Bemrose |
| 4,154,861 A | 5/1979 | Smith |
| 4,162,141 A | 7/1979 | West |
| 4,189,995 A | 2/1980 | Lohr et al. |
| 4,307,286 A | 12/1981 | Guibert |
| 4,307,659 A | 12/1981 | Martin et al. |
| 4,313,485 A | 2/1982 | Gidge et al. |
| 4,323,110 A | 4/1982 | Rubbright et al. |
| 4,326,342 A | 4/1982 | Schregenberger |
| 4,338,911 A | 7/1982 | Smith |
| 4,354,549 A | 10/1982 | Smith |
| 4,366,177 A | 12/1982 | Wells et al. |
| 4,374,319 A | 2/1983 | Guibert |
| 4,377,109 A | 3/1983 | Brown et al. |
| 4,381,442 A | 4/1983 | Guibert |
| 4,389,562 A | 6/1983 | Choudoir |
| 4,395,233 A | 7/1983 | Smith et al. |
| 4,397,299 A | 8/1983 | Taylor et al. |
| 4,404,898 A | 9/1983 | Chaudoir |
| 4,455,478 A | 6/1984 | Guibert |
| 4,462,383 A | 7/1984 | Henke et al. |
| 4,471,750 A | 9/1984 | Burtea |
| 4,472,887 A | 9/1984 | Avedian et al. |
| 4,474,498 A | 10/1984 | Smith |
| 4,479,776 A | 10/1984 | Smith |
| 4,484,561 A | 11/1984 | Baggott et al. |
| 4,492,839 A | 1/1985 | Smith |
| 4,515,143 A | 5/1985 | Jabas |
| 4,516,012 A | 5/1985 | Smith et al. |
| 4,601,237 A | 7/1986 | Harter et al. |
| 4,605,038 A | 8/1986 | Tchitdjian |
| 4,625,867 A | 12/1986 | Guibert |
| 4,626,661 A | 12/1986 | Henke |
| 4,631,029 A | 12/1986 | Lanham et al. |
| 4,679,542 A | 7/1987 | Smith et al. |
| 4,690,127 A | 9/1987 | Sank |
| 4,700,619 A | 10/1987 | Scanlon |
| 4,714,050 A | 12/1987 | Nichols |
| 4,722,683 A | 2/1988 | Royer |
| 4,727,853 A | 3/1988 | Stephan et al. |
| 4,739,154 A | 4/1988 | Bharara et al. |
| 4,750,276 A | 6/1988 | Smith et al. |
| 4,757,800 A | 7/1988 | Shei et al. |
| 4,822,981 A | 4/1989 | Chaudoir |
| 4,829,158 A | 5/1989 | Burnham |
| 4,829,982 A | 5/1989 | Abidor |
| 4,835,351 A | 5/1989 | Smith et al. |
| 4,865,864 A | 9/1989 | Rijswijck |
| 4,867,132 A | 9/1989 | Yencha |
| 4,870,254 A | 9/1989 | Arabori |
| 4,876,426 A | 10/1989 | Smith |
| 4,892,030 A | 1/1990 | Grieve |
| 4,896,137 A | 1/1990 | Jones et al. |
| 4,928,663 A | 5/1990 | Nevin et al. |
| 4,951,646 A | 8/1990 | Luebke et al. |
| 4,960,977 A | 10/1990 | Alden |
| 4,965,435 A | 10/1990 | Smith et al. |
| 4,981,416 A | 1/1991 | Nevin et al. |
| 4,994,181 A | 2/1991 | Mullaney, Jr. |
| 5,025,775 A | 6/1991 | Crisp |
| 5,121,737 A | 6/1992 | Yencha, III |
| 5,172,682 A | 12/1992 | Luebke et al. |
| 5,180,898 A | 1/1993 | Alden et al. |
| 5,205,274 A | 4/1993 | Smith et al. |
| 5,211,106 A | 5/1993 | Lucke |
| 5,222,474 A | 6/1993 | Yencha, III |
| 5,223,290 A | 6/1993 | Alden |
| 5,228,385 A | 7/1993 | Friedrich et al. |
| 5,231,920 A | 8/1993 | Alden et al. |
| 5,254,823 A | 10/1993 | McKee et al. |
| 5,309,981 A | 5/1994 | Binder |
| 5,361,749 A | 11/1994 | Smith et al. |
| 5,365,039 A | 11/1994 | Chaudoir |
| 5,421,316 A | 6/1995 | Heber |
| 5,421,317 A | 6/1995 | Cole et al. |
| 5,434,390 A | 7/1995 | McKee et al. |
| 5,454,295 A | 10/1995 | Cox et al. |
| 5,458,051 A | 10/1995 | Alden et al. |
| 5,460,157 A | 10/1995 | Prabhu |
| 5,483,044 A | 1/1996 | Thorneywork et al. |
| 5,492,055 A | 2/1996 | Nevin et al. |
| 5,497,760 A | 3/1996 | Alden et al. |
| 5,507,382 A | 4/1996 | Hartwell et al. |
| 5,530,223 A | 6/1996 | Culzoni et al. |
| 5,558,793 A | 9/1996 | McKee et al. |
| 5,572,984 A | 11/1996 | Alden et al. |
| 5,577,438 A | 11/1996 | Amitrano et al. |
| 5,582,093 A | 12/1996 | Amitrano et al. |
| 5,620,731 A | 4/1997 | McKee |
| 5,647,740 A | 7/1997 | Kobaru |
| 5,655,511 A | 8/1997 | Prabhu et al. |
| 5,676,044 A | 10/1997 | Lara, Jr. |
| 5,683,240 A | 11/1997 | Smith et al. |
| 5,747,775 A | 5/1998 | Tsukamoto et al. |
| 5,847,365 A | 12/1998 | Harter et al. |
| 5,880,436 A | 3/1999 | Keogh |
| 5,908,574 A | 6/1999 | Keogh |
| 5,927,265 A | 7/1999 | McKee et al. |
| 5,928,072 A | 7/1999 | Fulcher et al. |
| 5,928,541 A * | 7/1999 | Tsukamoto .............. A21B 1/245 126/21 A |
| 5,934,178 A | 8/1999 | Caridis et al. |
| 5,934,182 A | 8/1999 | Harter et al. |
| 5,941,235 A | 8/1999 | Carter |
| 5,951,901 A | 9/1999 | Douglas et al. |
| 5,954,986 A | 9/1999 | Tsukamoto et al. |
| 5,988,154 A | 11/1999 | Douglas et al. |
| 5,990,466 A | 11/1999 | McKee et al. |
| 6,008,483 A | 12/1999 | McKee et al. |
| 6,031,208 A | 2/2000 | Witt et al. |
| 6,049,066 A | 4/2000 | Wilson |
| 6,058,924 A | 5/2000 | Pool, III et al. |
| 6,060,701 A | 5/2000 | McKee et al. |
| 6,064,050 A | 5/2000 | Ishikawa et al. |
| 6,079,321 A | 6/2000 | Harter et al. |
| 6,111,224 A | 8/2000 | Witt |
| 6,116,895 A | 9/2000 | Onuschak |
| 6,140,619 A | 10/2000 | Couch |
| 6,140,626 A | 10/2000 | McKee et al. |
| 6,146,678 A | 11/2000 | Caridis et al. |
| 6,175,099 B1 | 1/2001 | Shei et al. |
| 6,192,877 B1 | 2/2001 | Moshonas et al. |
| 6,218,650 B1 | 4/2001 | Tsukamoto et al. |
| 6,252,201 B1 | 6/2001 | Nevarez |
| 6,259,064 B1 | 7/2001 | Wilson |
| 6,262,394 B1 | 7/2001 | Shei et al. |
| 6,262,396 B1 | 7/2001 | Witt et al. |
| 6,262,406 B1 | 7/2001 | McKee et al. |
| 6,320,165 B1 | 11/2001 | Ovadia |
| 6,323,462 B1 | 11/2001 | Strand |
| 6,350,965 B2 | 2/2002 | Fukushima et al. |
| 6,359,271 B1 | 3/2002 | Gidner et al. |
| 6,376,817 B1 | 4/2002 | McFadden et al. |
| 6,378,602 B2 | 4/2002 | Brown |
| 6,384,381 B2 | 5/2002 | Witt et al. |
| 6,399,930 B2 | 6/2002 | Day et al. |
| 6,403,937 B1 | 6/2002 | Day et al. |
| 6,425,388 B1 | 7/2002 | Korinchock |
| 6,441,355 B2 | 8/2002 | Thorneywork |
| 6,455,085 B1 | 9/2002 | Duta |
| 6,476,368 B2 | 11/2002 | Aronsson et al. |
| 6,486,455 B1 | 11/2002 | Merabet |
| 6,494,130 B2 | 12/2002 | Brown |
| 6,517,882 B2 | 2/2003 | Elia et al. |

(56) References Cited

U.S. PATENT DOCUMENTS

| | | |
|---|---|---|
| 6,526,961 B1 | 3/2003 | Hardenburger |
| 6,528,773 B2 | 3/2003 | Kim et al. |
| 6,534,688 B2 | 3/2003 | Klausmeyer |
| 6,539,934 B2 | 4/2003 | Moshonas et al. |
| 6,541,739 B2 | 4/2003 | Shei et al. |
| 6,552,305 B2 | 4/2003 | De'Longhi |
| 6,557,543 B2 | 5/2003 | Cole et al. |
| 6,576,874 B2 | 6/2003 | Zapata et al. |
| 6,595,117 B1 | 7/2003 | Jones et al. |
| 6,614,007 B1 | 9/2003 | Reay |
| 6,655,373 B1 | 12/2003 | Wiker |
| 6,660,982 B2 | 12/2003 | Thorneywork |
| 6,692,788 B1 | 2/2004 | Mottram et al. |
| 6,693,261 B2 | 2/2004 | Leutner |
| 6,712,063 B1 | 3/2004 | Thorneywork |
| 6,712,064 B2 | 3/2004 | Stacy et al. |
| 6,716,467 B2 | 4/2004 | Cole et al. |
| 6,805,112 B2 | 10/2004 | Cole et al. |
| 6,817,201 B2 | 11/2004 | Yingst |
| 6,817,283 B2 | 11/2004 | Jones et al. |
| 6,818,869 B2 | 11/2004 | Patti et al. |
| 6,833,032 B1 | 12/2004 | Douglas et al. |
| 6,833,533 B1 | 12/2004 | Wolfe et al. |
| 6,859,538 B1 | 3/2005 | Yu et al. |
| 6,874,495 B2 | 4/2005 | McFadden |
| 6,880,545 B2 | 4/2005 | Heber et al. |
| 6,903,318 B2 | 6/2005 | Thorneywork |
| 6,914,221 B1 | 7/2005 | Witt et al. |
| 6,933,472 B1 | 8/2005 | Smith et al. |
| 6,933,473 B2 | 8/2005 | Henke et al. |
| 6,934,690 B1 | 8/2005 | Van Horn et al. |
| 6,943,321 B2 | 9/2005 | Carbone et al. |
| 6,968,565 B1 | 11/2005 | Slaney et al. |
| 7,019,272 B2 | 3/2006 | Braunisch et al. |
| 7,055,518 B2 | 6/2006 | McFadden et al. |
| 7,082,941 B2 | 8/2006 | Jones et al. |
| 7,087,872 B1 | 8/2006 | Dobie et al. |
| 7,105,779 B2 | 9/2006 | Shei |
| 7,192,272 B2 | 3/2007 | Jones et al. |
| 7,196,291 B2 | 3/2007 | Cothran |
| 7,220,946 B2 | 5/2007 | Majchrzak |
| 7,227,102 B2 | 6/2007 | Shei |
| 7,326,882 B2 | 2/2008 | Faries, Jr. et al. |
| 7,328,654 B2 | 2/2008 | Shei |
| 7,328,695 B2 | 2/2008 | Tatsumu et al. |
| 7,329,847 B2 | 2/2008 | Tatsumu et al. |
| 7,343,912 B2 | 3/2008 | Jones et al. |
| 7,360,533 B2 | 4/2008 | McFadden |
| RE40,290 E | 5/2008 | Shei et al. |
| 7,370,647 B2 | 5/2008 | Thorneywork |
| 7,424,848 B2 | 9/2008 | Jones et al. |
| 7,435,931 B1 | 10/2008 | McKee et al. |
| 7,446,282 B2 | 11/2008 | Shei et al. |
| 7,468,495 B2 | 12/2008 | Carbone et al. |
| 7,480,627 B1 | 1/2009 | Van Horn et al. |
| 7,493,362 B2 | 2/2009 | Bogatin et al. |
| 7,507,938 B2 | 3/2009 | McFadden |
| 7,554,057 B2 | 6/2009 | Monny Dimouamoua |
| 7,575,000 B2 | 8/2009 | Jones et al. |
| 7,604,002 B2 | 10/2009 | Rabas et al. |
| 7,624,676 B2 | 12/2009 | Nishida et al. |
| 7,624,728 B1 | 12/2009 | Forbes |
| 7,781,702 B2 | 8/2010 | Nam et al. |
| 7,784,457 B2 | 8/2010 | Akdag et al. |
| 7,792,920 B2 | 9/2010 | Istvan et al. |
| 7,793,586 B2 | 9/2010 | Rabas |
| 7,825,358 B2 | 11/2010 | Kim |
| 7,836,874 B2 | 11/2010 | McFadden |
| 7,836,875 B2 | 11/2010 | McFadden et al. |
| 7,884,306 B2 | 2/2011 | Leach |
| 7,886,658 B2 | 2/2011 | McFadden et al. |
| 7,900,228 B2 | 3/2011 | Stark et al. |
| 7,905,173 B2 | 3/2011 | Sus et al. |
| 7,910,866 B2 | 3/2011 | Hwang et al. |
| 7,921,841 B2 | 4/2011 | McKee et al. |
| 7,941,819 B2 | 5/2011 | Stark et al. |
| 7,942,278 B2 | 5/2011 | Martin et al. |
| 7,946,224 B2 | 5/2011 | McFadden |
| 7,956,304 B2 | 6/2011 | Bacigalupe et al. |
| 8,006,685 B2 | 8/2011 | Bolton et al. |
| 8,011,293 B2 | 9/2011 | McFadden et al. |
| 8,026,463 B2 | 9/2011 | McKee et al. |
| 8,029,274 B2 | 10/2011 | Jones et al. |
| 8,035,062 B2 | 10/2011 | McFadden et al. |
| 8,035,065 B2 | 10/2011 | Kim et al. |
| 8,042,532 B2 | 10/2011 | Dobie et al. |
| 8,047,128 B2 | 11/2011 | Salvaro |
| 8,058,590 B2 | 11/2011 | Thorneywork et al. |
| 8,058,594 B2 | 11/2011 | Hwang |
| 8,063,342 B2 | 11/2011 | Hines, Jr. |
| 8,071,922 B2 | 12/2011 | Claesson et al. |
| 8,093,538 B2 | 1/2012 | Claesson et al. |
| 8,113,190 B2 | 2/2012 | Dougherty |
| 8,124,200 B2 | 2/2012 | Quella et al. |
| 8,134,101 B2 | 3/2012 | Majchrzak |
| 8,134,102 B2 | 3/2012 | McKee et al. |
| 8,136,442 B2 | 3/2012 | Strutin-Belinoff et al. |
| 8,143,560 B2 | 3/2012 | Park et al. |
| 8,164,036 B2 | 4/2012 | Lee |
| 8,168,928 B2 | 5/2012 | Kim et al. |
| 8,210,844 B2 | 7/2012 | Wolfe et al. |
| 8,212,188 B2 | 7/2012 | Kim et al. |
| 8,218,955 B2 | 7/2012 | Witt |
| 8,224,892 B2 | 7/2012 | Bogatin et al. |
| 8,253,084 B2 | 8/2012 | Toyoda et al. |
| 8,258,440 B2 | 9/2012 | Shei et al. |
| 8,292,494 B2 | 10/2012 | Rosa et al. |
| 8,297,270 B2 | 10/2012 | McFadden |
| 8,304,702 B2 | 11/2012 | Kim |
| 8,338,756 B2 | 12/2012 | Shei et al. |
| 8,359,351 B2 | 1/2013 | Istvan et al. |
| 8,378,265 B2 | 2/2013 | Greenwood et al. |
| 8,389,907 B2 | 3/2013 | Willett |
| 8,399,812 B2 | 3/2013 | Thorneywork et al. |
| 8,490,475 B2 | 7/2013 | Dejmek et al. |
| 8,561,321 B2 | 10/2013 | Inoue et al. |
| 8,586,900 B2 | 11/2013 | Kim et al. |
| 8,637,792 B2 | 1/2014 | Agnello et al. |
| 8,658,953 B2 | 2/2014 | McFadden et al. |
| 8,680,439 B2 | 3/2014 | Shei et al. |
| 8,680,449 B2 | 3/2014 | Kim |
| 8,695,487 B2 | 4/2014 | Sakane et al. |
| 8,707,945 B2 | 4/2014 | Hasslberger et al. |
| 8,733,236 B2 | 5/2014 | McKee |
| 8,735,778 B2 | 5/2014 | Greenwood et al. |
| 8,746,134 B2 | 6/2014 | McKee |
| 8,893,705 B2 | 11/2014 | McFadden |
| 8,895,902 B2 | 11/2014 | Shei et al. |
| 8,941,041 B2 | 1/2015 | Lee |
| 8,968,848 B2 | 3/2015 | Quella et al. |
| 8,991,383 B2 | 3/2015 | Johnson |
| 8,993,945 B2 | 3/2015 | McKee et al. |
| 9,074,776 B2 | 7/2015 | Greenwood et al. |
| 9,074,777 B2 | 7/2015 | Catalogne et al. |
| 9,134,033 B2 | 9/2015 | Nevarez et al. |
| 9,157,639 B2 | 10/2015 | Gallici et al. |
| 9,161,547 B2 | 10/2015 | McKee |
| RE45,789 E | 11/2015 | Shei et al. |
| 9,265,400 B2 | 2/2016 | Bigott |
| 9,277,598 B2 | 3/2016 | Lee et al. |
| 9,288,997 B2 | 3/2016 | McKee |
| 9,301,646 B2 | 4/2016 | Rosa et al. |
| 9,303,879 B2 | 4/2016 | Price et al. |
| 9,326,639 B2 | 5/2016 | McKee et al. |
| 9,341,382 B2 | 5/2016 | Kim |
| 9,351,495 B2 | 5/2016 | McFadden |
| 9,372,006 B2 | 6/2016 | McKee et al. |
| 9,474,284 B2 | 10/2016 | Dougherty |
| 9,480,364 B2 | 11/2016 | McKee et al. |
| 9,516,704 B2 | 12/2016 | Stanger |
| 2001/0025842 A1 | 10/2001 | Witt et al. |
| 2002/0003140 A1 | 1/2002 | Day et al. |
| 2002/0134778 A1 | 9/2002 | Day et al. |
| 2003/0141296 A1 | 7/2003 | Thorneywork |

(56) References Cited

U.S. PATENT DOCUMENTS

| | | |
|---|---|---|
| 2004/0026401 A1 | 2/2004 | Jones et al. |
| 2004/0163635 A1 | 8/2004 | Thorneywork |
| 2005/0000957 A1 | 1/2005 | Jones et al. |
| 2005/0045173 A1 | 3/2005 | Heber et al. |
| 2005/0173397 A1 | 8/2005 | Majchrzak et al. |
| 2005/0205547 A1 | 9/2005 | Wenzel |
| 2005/0211109 A1 | 9/2005 | Majchrzak et al. |
| 2005/0258171 A1 | 11/2005 | Witt |
| 2006/0020962 A1 | 1/2006 | Stark et al. |
| 2006/0026636 A1 | 2/2006 | Stark et al. |
| 2006/0026638 A1 | 2/2006 | Stark et al. |
| 2006/0031880 A1 | 2/2006 | Stark et al. |
| 2006/0041927 A1 | 2/2006 | Stark et al. |
| 2006/0064720 A1 | 3/2006 | Istvan et al. |
| 2006/0080408 A1 | 4/2006 | Istvan et al. |
| 2006/0085825 A1 | 4/2006 | Istvan et al. |
| 2006/0085835 A1 | 4/2006 | Istvan et al. |
| 2006/0102017 A1 | 5/2006 | Rabas et al. |
| 2006/0201495 A1 | 9/2006 | Jones et al. |
| 2007/0092670 A1 | 4/2007 | Quella et al. |
| 2007/0108179 A1 | 5/2007 | Hines, Jr. |
| 2007/0125319 A1 | 6/2007 | Jones et al. |
| 2007/0210064 A1 | 9/2007 | Quella et al. |
| 2008/0008795 A1 | 1/2008 | Thorneywork et al. |
| 2008/0092754 A1 | 4/2008 | Noman |
| 2008/0105133 A1 | 5/2008 | McFadden et al. |
| 2008/0105136 A1 | 5/2008 | McFadden |
| 2008/0105249 A1 | 5/2008 | McFadden et al. |
| 2008/0106483 A1 | 5/2008 | McFadden et al. |
| 2008/0127833 A1 | 6/2008 | Lee |
| 2008/0134903 A1 | 6/2008 | Kim et al. |
| 2008/0148961 A1 | 6/2008 | Hwang et al. |
| 2008/0148963 A1 | 6/2008 | Kim et al. |
| 2008/0149628 A1 | 6/2008 | Thorneywork et al. |
| 2008/0149630 A1 | 6/2008 | Hwang |
| 2008/0149631 A1 | 6/2008 | Lee |
| 2008/0149632 A1 | 6/2008 | Kim et al. |
| 2008/0149633 A1 | 6/2008 | Kim |
| 2008/0156202 A1 | 7/2008 | Park et al. |
| 2008/0245359 A1 | 10/2008 | Williamson |
| 2008/0296284 A1 | 12/2008 | McFadden et al. |
| 2008/0302253 A1 | 12/2008 | Salvaro |
| 2009/0095727 A1 | 4/2009 | Majchrzak |
| 2009/0139367 A1 | 6/2009 | Rosa et al. |
| 2009/0142719 A1 | 6/2009 | Scheuring, III et al. |
| 2009/0165778 A1 | 7/2009 | Harter et al. |
| 2009/0222612 A1 | 9/2009 | Thorneywork et al. |
| 2010/0000509 A1 | 1/2010 | Babington |
| 2010/0031193 A1 | 2/2010 | Stark et al. |
| 2010/0054717 A1 | 3/2010 | Lee et al. |
| 2010/0058936 A1 | 3/2010 | Schjerven, Sr. et al. |
| 2010/0126979 A1 | 5/2010 | Willett |
| 2010/0133263 A1 | 6/2010 | Toyoda et al. |
| 2010/0166398 A1 | 7/2010 | Witt |
| 2010/0320198 A1 | 12/2010 | Kim |
| 2010/0320199 A1 | 12/2010 | Kim |
| 2010/0326290 A1 | 12/2010 | Gallici et al. |
| 2010/0332994 A1 | 12/2010 | Istvan et al. |
| 2011/0005409 A1 | 1/2011 | Majchrzak |
| 2011/0083657 A1 | 4/2011 | Ploof et al. |
| 2011/0126818 A1 | 6/2011 | Behle et al. |
| 2012/0017770 A1 | 1/2012 | Sakane et al. |
| 2012/0021100 A1 | 1/2012 | Thorneywork et al. |
| 2012/0067226 A1 | 3/2012 | Claesson et al. |
| 2012/0118875 A1 | 5/2012 | Jussel |
| 2012/0138597 A1 | 6/2012 | Quella et al. |
| 2012/0187115 A1 | 7/2012 | Toyoda et al. |
| 2012/0192725 A1 | 8/2012 | Toyoda et al. |
| 2012/0248095 A1 | 10/2012 | Lee et al. |
| 2012/0328752 A1 | 12/2012 | Green et al. |
| 2013/0004630 A1 | 1/2013 | McFadden |
| 2013/0175253 A1 | 7/2013 | Shei et al. |
| 2013/0220296 A1 | 8/2013 | Catalogne et al. |
| 2013/0255657 A1 | 10/2013 | Schootstra et al. |
| 2013/0306052 A1 | 11/2013 | Price et al. |
| 2013/0306616 A1 | 11/2013 | Wildebush |
| 2014/0026764 A1 | 1/2014 | Sykes et al. |
| 2014/0048055 A1 | 2/2014 | Ruther |
| 2014/0083309 A1 | 3/2014 | Reese et al. |
| 2014/0099420 A1 | 4/2014 | Petronio et al. |
| 2014/0116268 A1 | 5/2014 | Bigott et al. |
| 2014/0137852 A1 | 5/2014 | Radford et al. |
| 2014/0161952 A1 | 6/2014 | Sykes |
| 2014/0161953 A1 | 6/2014 | Jones et al. |
| 2014/0174426 A1 | 6/2014 | Moon et al. |
| 2014/0202444 A1 | 7/2014 | Dobie |
| 2014/0216267 A1 | 8/2014 | McKee |
| 2014/0217083 A1 | 8/2014 | McKee |
| 2014/0231407 A1 | 8/2014 | Kantas |
| 2014/0261373 A1 | 9/2014 | Yingst et al. |
| 2014/0290003 A1 | 10/2014 | Mick et al. |
| 2014/0318387 A1 | 10/2014 | Kim |
| 2014/0322417 A1 | 10/2014 | Kim |
| 2014/0326710 A1 | 11/2014 | McKee et al. |
| 2015/0047514 A1 | 2/2015 | Abe et al. |
| 2016/0050939 A1 | 2/2016 | Riggle et al. |
| 2016/0066585 A1 | 3/2016 | Lago |
| 2016/0273843 A1 | 9/2016 | Wenzel |
| 2016/0327278 A1 | 11/2016 | McKee et al. |
| 2016/0345592 A1 | 12/2016 | McKee et al. |
| 2016/0348920 A1 | 12/2016 | Yingst et al. |
| 2016/0356504 A1 | 12/2016 | McKee et al. |
| 2016/0356505 A1 | 12/2016 | McKee et al. |
| 2016/0356506 A1 | 12/2016 | McKee et al. |
| 2017/0010003 A1 | 1/2017 | Dougherty |

FOREIGN PATENT DOCUMENTS

| | | |
|---|---|---|
| EP | 1624255 A1 | 9/2006 |
| EP | 1732359 A2 | 12/2006 |
| EP | 1992879 A1 | 11/2008 |
| EP | 2735806 A1 | 5/2014 |
| WO | 00064219 A1 | 10/2000 |
| WO | 2007020587 A1 | 2/2007 |
| WO | 2015101399 A1 | 7/2015 |

* cited by examiner

OVEN USING STRUCTURED AIR

FIELD OF THE INVENTION

The present invention relates to cooking ovens in general, and in particular to a convection or combi oven using structured air inlets to introduce air into a cooking cavity.

BACKGROUND OF THE INVENTION

An oven generally includes a cooking cavity configured to receive food items for cooking. The oven also includes a heating element, which can be an electric resistance element or a gas burner, for generating heat energy to cook any food items placed within an oven cavity. Some ovens may include an air blower, such as a fan, for forcing movement of heated air within the oven cavity, and those ovens are commonly referred to as convection ovens. Although convection ovens that have the ability to introduce moisture into the heated air stream are commonly referred to as "combi" ovens, the term convection oven used herein is understood by those skilled in the art to include both convection and combi ovens.

When cooking in a typical convection oven, heated air within the cooking cavity is circulated by a fan. The fan initiates a flow of heated air by pulling air in a generally horizontal direction from the cooking cavity through one or more openings ("return air openings") which are typically disposed on a rear wall of the cooking cavity. After being heated by a heating element, the heated air is forced by the fan into the cooking cavity through one or more of the walls of the cook cavity, such as the left and right side walls. The heated air moves through the cooking cavity in a generally horizontal direction to help distribute heat energy to food articles placed within the cooking cavity. An example of the heating system of a typical convection oven can be found in U.S. Pat. No. 4,395,233 to Smith et al.

Air impingement is a special form of convection cooking whereby air enters the cook cavity through openings ("air inlets") in one or more flat panels ("jet plates") typically disposed along the top and bottom walls of the cook cavity. These openings are typically in the form of small holes (e.g., 0.5 inch in diameter) placed in such a way that the heated air moving through adjacent holes forms adjacent air columns directed towards the upper and lower surfaces of food articles placed in the cooking cavity. In order to increase the rate of heat transfer from these columns of heated air to the food, such air is typically moving at a higher velocity than the air moving in typical convection ovens. However, these columns of rapidly moving heated air would cause spotting on the food surface if the food were not moving relative to the jet plates. An example of the heating system and food movement of a typical air impingement oven can be found in U.S. Pat. No. 4,679,542 to Smith et al.

A plurality of linearly extended air inlets may reduce or eliminate spotting in ovens where reduced cook times are desired but food is not moved relative to the jet plates. However, in order to provide the necessary level of air velocity and directionality, the linearly extended air inlets need to have a significant vertical dimension, substantially increasing the height or size of the oven, which is not desirable for commercial kitchens where convection ovens are most often used. An example of linearly extended air inlets with significant vertical dimension can be found in U.S. Pat. No. 8,026,463 to McKee et al.

Linearly extended air inlets without significant vertical dimension, such as an array of parallel slots in a jet plate, have severe limitations. For example, as illustrated in FIG. 1, a jet plate 100 has a plurality of air inlets 101, each in the form of a narrow slot having two substantially parallel edges 102 of equal length. One problem of using a narrow slot in a jet plate to introduce air into the cooking cavity is that air frictions generated at the edges of a narrow slot reduce the volume of the air passing through the slot. However, widening the slot to increase the air volume would then reduce the velocity of the air passing through, thereby decreasing cook speed.

Another problem of using a slot as an air inlet is that, because air passes through an opening in a relatively thin plate, the slot by itself cannot provide the level of air directionality that may be necessary to penetrate the temperature gradients (boundary layers) surrounding the food articles being cooked in the cooking cavity. Accordingly, a convection oven using slots as air inlets is not effective in accelerating the cooking process in the cooking cavity.

In addition, there may be other forces in the cooking cavity that can affect the air passing through slots and cause unevenness in the distribution of air flow within the cooking cavity. For example, return air openings can cause unevenness in the air flow distribution within the cooking cavity because the areas proximate to the return air openings attract more air flow compared to other areas within the cooking cavity. In another example, a gradient of air pressure within the air plenum can cause unevenness in the air flow distribution within the cooking cavity because a portion of the air plenum having a higher air pressure forces more air flow into the proximate area within the cooking cavity. The unevenness of air flow distribution within the cooking cavity caused by these forces cannot be easily eliminated in a convection oven that uses slots as air inlets. As a result, food items placed in the cooking cavity in such a convection oven may be cooked unevenly.

Consequently, it would be desirable to provide a convection oven using improved air inlets that can eliminate the above-mentioned problems.

SUMMARY OF THE INVENTION

It has now been found that the above and related objects of the present invention are obtained in the form of several related aspects, including an oven using structured air inlets.

A jet plate for directing a flow of air into a cooking cavity of an oven, in accordance with an exemplary embodiment of the present invention, comprises a body configured to be disposed along a top wall or a bottom wall of the cooking cavity, wherein the body comprises a front end disposed proximate to a front of the cooking cavity, a rear end disposed proximate to a rear of the cooking cavity, and left and right ends disposed proximate respectively to left and right sides of the cooking cavity, and one or more structured air inlets that are openings through the body, each of the structured air inlets comprising a plurality of holes and slots that are alternatingly arranged and serially connected.

In at least one embodiment, the jet plate is configured to separate the cooking cavity from an air plenum of the oven and enable air to be introduced into the cooking cavity from the air plenum.

In at least one embodiment, the body is a substantially rectangular shaped, flat plate.

In at least one embodiment, each of the structured air inlets extends along a substantially straight line.

In at least one embodiment, each of the slots comprises two substantially parallel straight edges having substantially equal lengths.

In at least one embodiment, edges of each of the holes form substantially circular arcs.

In at least one embodiment, a width of each of the slots is smaller than a diameter of each of the holes.

In at least one embodiment, a length of each of the slots is greater than a diameter of each of the holes.

In at least one embodiment, a number of the holes is greater than a number of the slots in at least one of the structured air inlets.

In at least one embodiment, at least one of the structured air inlets begins with a hole and ends with a hole.

In at least one embodiment, each of the structured air inlets extends longitudinally in parallel to a direction from the front end of the body to the rear end of the body.

In at least one embodiment, each of the structured air inlets extends transversely in parallel to a direction from the left end of the body to the right end of the body.

In at least one embodiment, each of the structured air inlets extends diagonally in parallel to a direction from where the left and front ends of the body meet to where the right and rear ends of the body meet.

In at least one embodiment, each of the structured air inlets extends diagonally in parallel to a direction from where the right and front ends of the body meet to where the left and rear ends of the body meet.

In at least one embodiment, all of the structured air inlets are substantially identical in size and dimension.

In at least one embodiment, the holes in at least one of the structured air inlets are different in size.

In at least one embodiment, the hole disposed proximate to one of the left and right ends of the body is larger in size than the hole disposed proximate to the other one of the left and right ends of the body in at least one of the structured air inlets.

In at least one embodiment, the one or more structured air inlets comprise a first structured air inlet disposed proximate to one of the front and rear ends of the body and a second structured air inlet disposed proximate to the other one of the front and rear ends of the body, the holes in the first structured air inlet being larger in size than the holes in the second structured air inlet.

In at least one embodiment, the one or more structured air inlets comprise two or more substantially parallel structured air inlets and a spacing between adjacent ones of the structured air inlets is configured to avoid a gap or an overlap between coverages of air flows from the adjacent structured air inlets on a food product in the cooking cavity.

An oven comprising a cooking cavity configured to receive a food product, a fan, an air plenum configured to receive air from the fan, and a jet plate configured to separate the cooking cavity from the air plenum and direct a flow of the air from the air plenum into the cooking cavity, the jet plate comprising a body configured to be disposed along a top wall or a bottom wall of the cooking cavity, wherein the body comprises a front end disposed proximate to a front of the cooking cavity, a rear end disposed proximate to a rear of the cooking cavity, and left and right ends disposed proximate respectively to left and right sides of the cooking cavity, and one or more structured air inlets that are openings through the body, each of the structured air inlets comprising a plurality of holes and slots that are alternatingly arranged and serially connected.

In at least one embodiment, the body is a substantially rectangular shaped, flat plate.

In at least one embodiment, each of the structured air inlets extends along a substantially straight line.

In at least one embodiment, each of the slots comprises two substantially parallel straight edges having substantially equal lengths.

In at least one embodiment, edges of each of the holes form substantially circular arcs.

In at least one embodiment, a width of each of the slots is smaller than a diameter of each of the holes.

In at least one embodiment, a length of each of the slots is greater than a diameter of each of the holes.

In at least one embodiment, a number of the holes is greater than a number of the slots in at least one of the structured air inlets.

In at least one embodiment, at least one of the structured air inlets begins with a hole and ends with a hole.

In at least one embodiment, each of the structured air inlets extends longitudinally in parallel to a direction from the front end of the body to the rear end of the body.

In at least one embodiment, each of the structured air inlets extends transversely in parallel to a direction from the left end of the body to the right end of the body.

In at least one embodiment, each of the structured air inlets extends diagonally in parallel to a direction from where the left and front ends of the body meet to where the right and rear ends of the body meet.

In at least one embodiment, each of the structured air inlets extends diagonally in parallel to a direction from where the right and front ends of the body meet to where the left and rear ends of the body meet.

In at least one embodiment, all of the structured air inlets are substantially identical in size and dimension.

In at least one embodiment, the holes in at least one of the structured air inlets are different in size.

In at least one embodiment, the hole disposed proximate to one of the left and right ends of the body is larger in size than the hole disposed proximate to the other one of the left and right ends of the body in at least one of the structured air inlets.

In at least one embodiment, the one or more structured air inlets comprise a first structured air inlet disposed proximate to one of the front and rear ends of the body and a second structured air inlet disposed proximate to the other one of the front and rear ends of the body, the holes in the first structured air inlet being larger in size than the holes in the second structured air inlet.

In at least one embodiment, the oven further comprises one or more return air openings, wherein the holes of the structured air inlets disposed proximate to the one or more return air openings are smaller in size than the holes of the structured air inlets disposed proximate to an opposite side of the one or more return air openings.

In at least one embodiment, one portion of the air plenum has a greater air pressure than other portions of the air plenum and the holes of the structured air inlets disposed proximate to the one portion of the air plenum are smaller in size than the holes of the structured air inlets disposed proximate to the other portions of the air plenum.

In at least one embodiment, the one or more structured air inlets in the jet plate comprise two or more substantially parallel structured air inlets and a spacing between adjacent ones of the structured air inlets is configured to avoid a gap or an overlap between coverages of air flows from the adjacent structured air inlets on the food product in the cooking cavity.

These and other features and advantages of the present invention will become apparent in the following detailed written description of various exemplary embodiments of this invention.

BRIEF DESCRIPTION OF THE DRAWINGS

The invention itself, as well as a preferred mode of use, further objects, and advantages thereof, will best be understood by reference to the following detailed description of illustrative and exemplary embodiments when read in conjunction with the accompanying drawings, wherein.

DETAILED DESCRIPTION OF THE EXEMPLARY EMBODIMENTS

Figure 2:
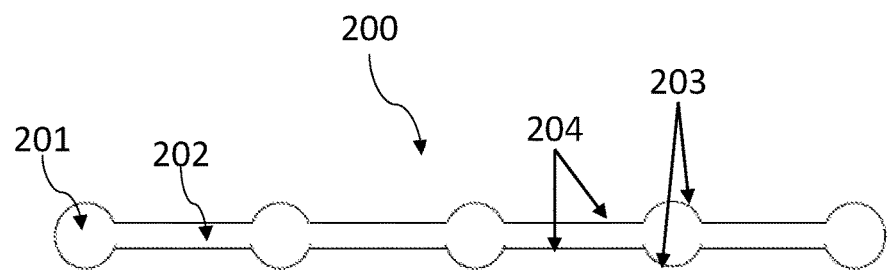
FIG. 2 is a top view of a structured air inlet in accordance with an exemplary embodiment of the present invention.

Referring now to the drawings and in particular to FIG. 2, there is depicted a structured air inlet 200, as viewed from above, for introducing air into a cooking cavity of a convection oven in accordance with an exemplary embodiment of the present invention. In this exemplary embodiment, structured air inlet 200 comprises holes 201 and slots 202 that are alternatingly arranged and serially connected (e.g., interconnected hole, slot, hole, slot, . . . , hole, as shown in FIG. 2). Preferably, a structured air inlet begins with a hole portion at one end and ends with a hole portion at the opposite end, as shown in FIG. 2.

Figure 1:
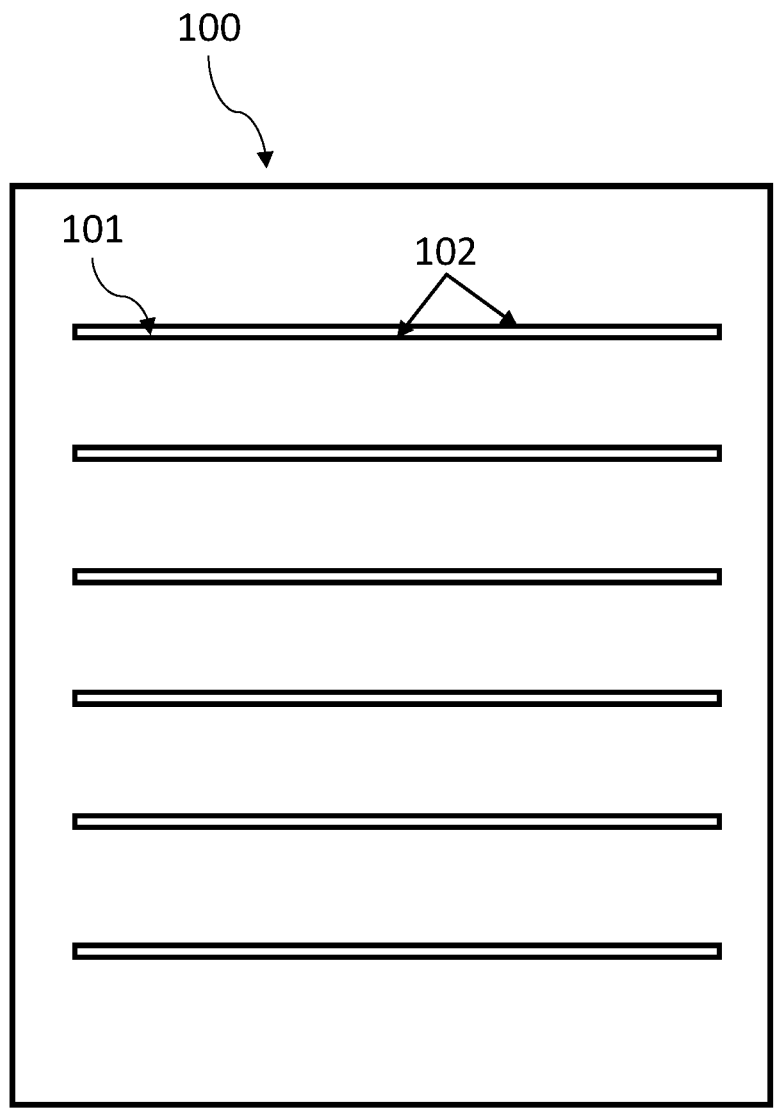
FIG. 1 is a top view of a jet plate for a conventional oven.
Figure 3:
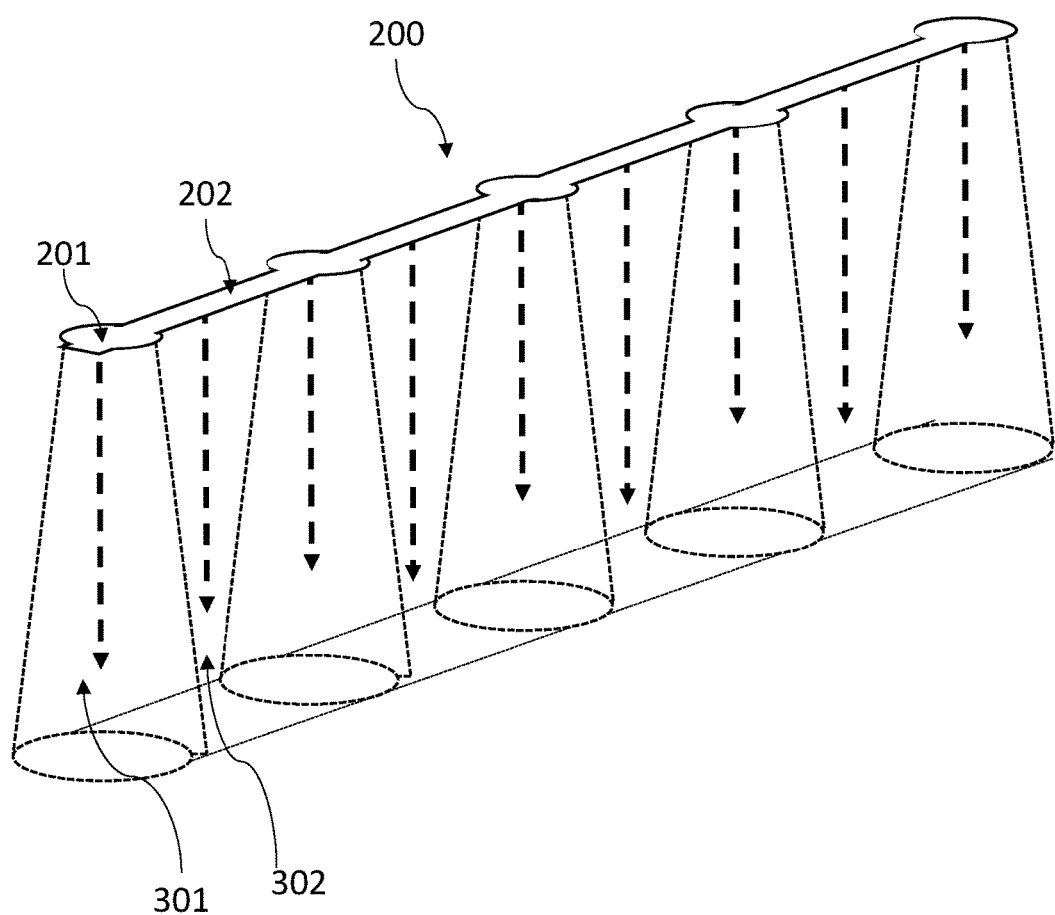
FIG. 3 is an isometric view of air flowing downward from the structured air inlet from FIG. 2.

This alternating hole-slot arrangement in structured air inlet 200 enables air to be introduced into a cooking cavity in a structured formation that can improve cooking speed and cooking efficiency. FIG. 3 provides an isometric view of such a structured formation of air flowing downward from structured air inlet 200, in accordance with an exemplary embodiment of the present invention. In alternative embodiments, air can flow upward from a structured air inlet. In FIG. 3, the air passing through slot portions 202 forms moving air sheets 302, each having a trapezoidal prism-like structure with the base area being larger than the top area. Each of air sheets 302 is accompanied on both sides by adjacent moving air columns 301, each having a truncated cone-like structure with the base area being larger than the top area, which are formed by the air passing through adjacent hole portions 201. The moving air columns 301 help accelerate the moving air sheets 302. In this way, even if structured air inlet 200 has no substantial vertical dimension, it can still create air flows 301, 302 with a sufficient level of directionality to penetrate the temperature gradients surrounding the food item being cooked in the cooking cavity, thereby improving cooking speed and cooking efficiency of a convection oven. Moreover, unlike simple slot-shaped air inlets discussed above in connection with FIG. 1, the speed and volume of air flow passing through structured air inlet 200 are not substantially affected by air frictions at the slot edges.

Referring back to FIG. 2, structured air inlet 200 in this exemplary embodiment extends along a substantially straight line. However, the present invention is not limited only to such a configuration. For example, a structured air inlet in alternative embodiments may comprise holes and slots that are arranged alternatingly and serially connected in a triangle wave or sawtooth wave-like manner.

As shown in FIG. 2, edges 203 of each of hole portions 201 of structured air inlet 200 may form substantially circular arcs. Alternatively, edges of a hole portion of a structured air inlet may be at least partly elliptical or polygonal.

Each of slot portions 202 of structured air inlet 200 may comprise two substantially parallel straight edges 204 having substantially equal lengths, as shown in FIG. 2. In alternative embodiments, edges of a slot portion of a structured air inlet may not be parallel or straight.

As shown in FIG. 2, the distance between two opposite edges 204 of slot portion 202 (or "width" of a slot portion) is generally smaller than the distance between two opposite edges 203 of hole portion 201 (or "diameter" of a hole portion). On the other hand, the length of slot portion 202 (e.g., the length of its edge 204) is generally greater than the diameter of hole portion 201.

While structured air inlet 200 in FIG. 2 comprises holes 201 of substantially same size and dimension and slots 202 of substantially same size and dimension, a structured air inlet in alternative embodiments may comprise holes of different sizes and dimensions and/or slots of different sizes and dimensions, as further discussed below.

In FIG. 2, structured air inlet 200 comprises five hole portions 201 and four slot portions 202 in accordance with an exemplary embodiment of the present invention. The present invention does not limit the number of hole portions and the number of slot portions in a structured air inlet to certain fixed numbers. For example, in at least one alternative embodiment, a structured air inlet may comprise 8 hole portions and 7 slot portions. In another alternative embodiment, a structured air inlet may comprise 2 hole portions and a single slot portion. In a preferred embodiment wherein a structured air inlet has holes at both ends, the number of hole portions is greater than the number of slot portions by one, as shown in FIG. 2.

Figure 4:
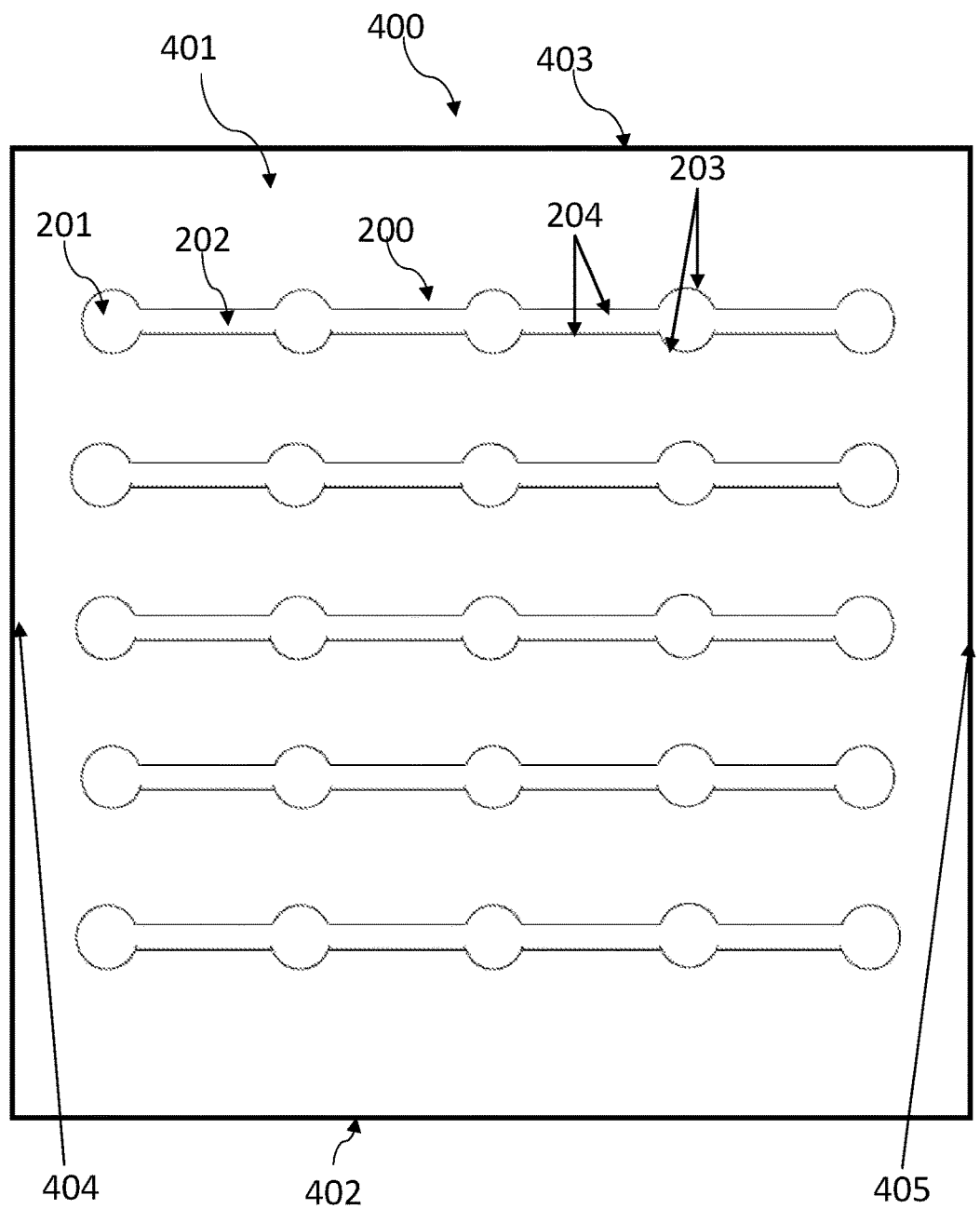
FIG. 4 is a top view of a jet plate comprising a plurality of structured air inlets in accordance with an exemplary embodiment of the present invention.

FIG. 4 illustrates a jet plate 400 for directing a flow of air into a cooking cavity of a convection oven in accordance with an exemplary embodiment of the present invention. Jet plate 400 comprises a body 401 and one or more structured air inlets 200 of FIG. 2, which are formed as openings through body 401. In some embodiments, body 401 of jet plate 400 may be configured to be disposed along a top wall or a bottom wall of a cooking cavity of the oven (not shown). In some embodiments, body 401 of jet plate 400 defines a top wall or a bottom wall of a cooking cavity.

As shown in FIG. 4, when jet plate 400 comprises multiple structured air inlets 200, the structured air inlets may be arranged in a parallel formation and the spacing between any two adjacent structured air inlets may be substantially identical.

Figure 5:
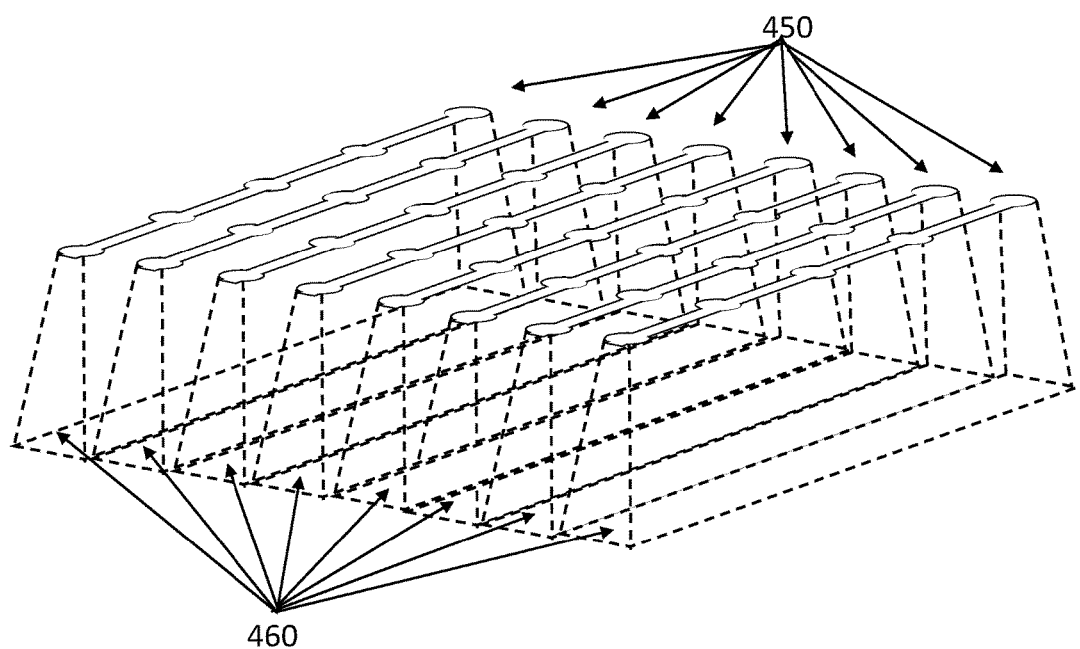
FIG. 5 is an isometric view of air flowing downward from an array of structured air inlets in accordance with an exemplary embodiment of the present invention.

The spacing between two adjacent structured air inlets may also be designed to avoid a gap or an overlap between coverages of air flows from the two adjacent structured air inlets on a food product placed within the cooking cavity. If the structured air inlets are spaced too far apart, there are gaps in coverages of air flow on the food product such that, for example, portions of the food product proximate to the structured air inlets would become darker compared to the areas on the food product in the gap that receive no directed air flow. On the other hand, if the structured air inlets are spaced too close to each other, then coverages of air flows from two adjacent structured air inlets overlap on the food product, causing a darker stripe on the food product where the overlap occurs. Preferably, the spacing between the structured air inlets is designed to avoid gaps or overlaps in coverages of air flow from the two adjacent structured air inlets that would cause such striping on a food product. FIG. 5 illustrates an array of optimally spaced structured air inlets 450 which produces a substantially even coverage 460 of air flows without any gap or overlap in accordance with an exemplary embodiment of the present invention.

In some embodiments, jet plate 400 may be configured to separate the cooking cavity from an air plenum (not shown) located above or below the cooking cavity and enable air to be introduced into the cooking cavity from the air plenum.

In some embodiments, body 401 of jet plate 400 may be a substantially rectangular shaped, flat plate. In some embodiments, body 401 may comprise a front end 402 disposed proximate to a front of the cooking cavity, a rear end 403 disposed proximate to a rear of the cooking cavity, a left end 404 disposed proximate to a left side of the cooking cavity, and a right end 405 disposed proximate to a right side of the cooking cavity.

As shown in FIG. 4, each of structured air inlets 200 may extend transversely in parallel to a direction from left end 404 to right end 405 of body 401. In alternative embodiments, each of structured air inlets 200 may extend longitudinally in parallel to a direction extending from front end 402 to rear end 403 of body 401; or diagonally in parallel to a direction extending from where left end 404 and front end 402 of body 401 meet to where right end 405 and rear end 403 of body 401 meet; or diagonally in parallel to a direction extending from where right end 405 and front end 402 of body 401 meet to where left end 404 and rear end 403 of body 401 meet; or in any other arrangement suitable to meet the cooking needs of the convection oven.

A jet plate comprising structured air inlets, such as jet plate 400 shown in FIG. 4, can be used in various types of cooking ovens, such as convection or combi ovens. In addition, a jet plate and its structured air inlets may be configured in various ways to adapt to different oven configurations and dimensions. For example, a jet plate and its structured air inlets can be configured to adapt to either a half-sized oven or a full-sized oven.

Figure 6:
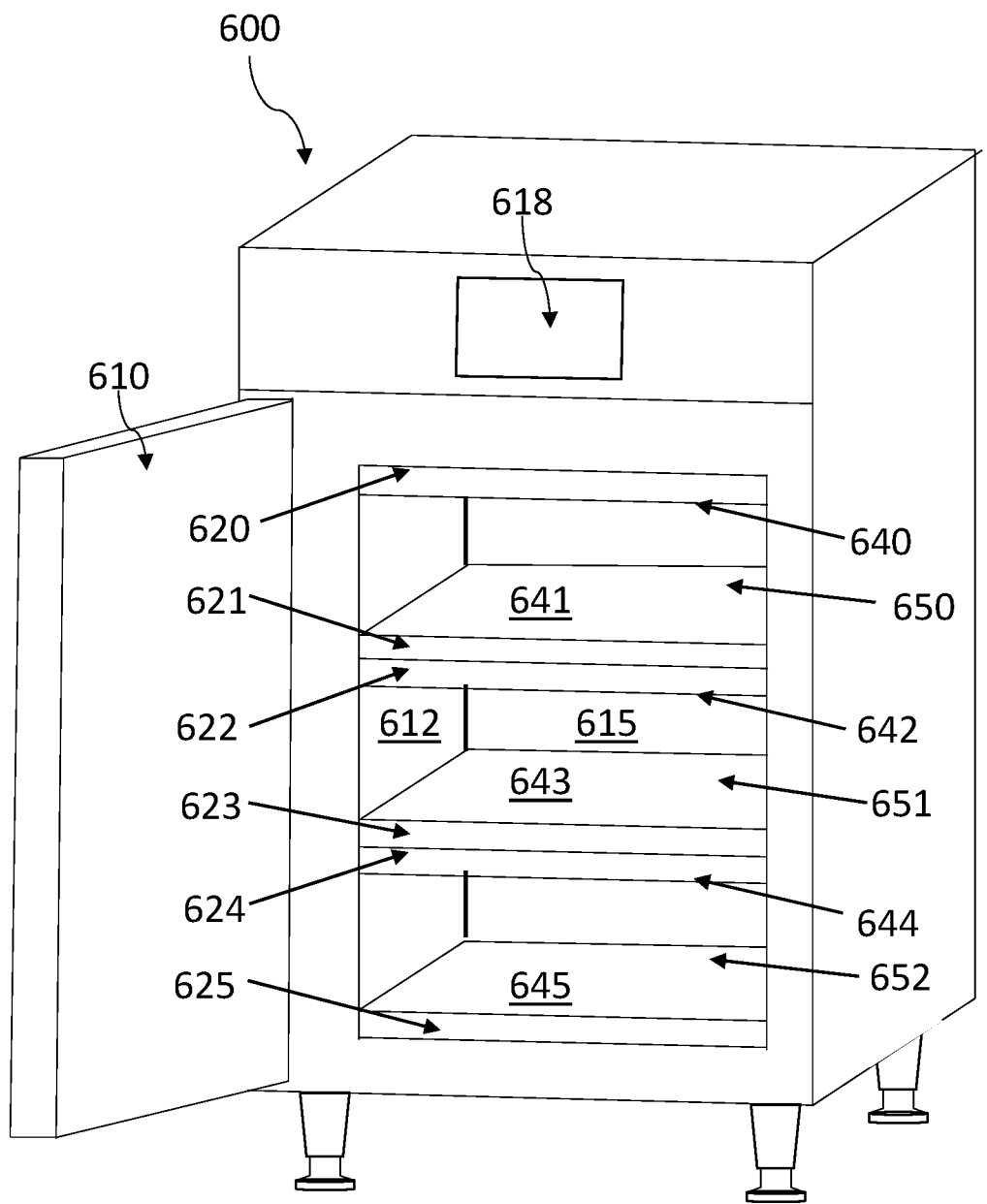
FIG. 6 is an isometric view of a convection oven in accordance with an exemplary embodiment of the present invention.
Figure 7:
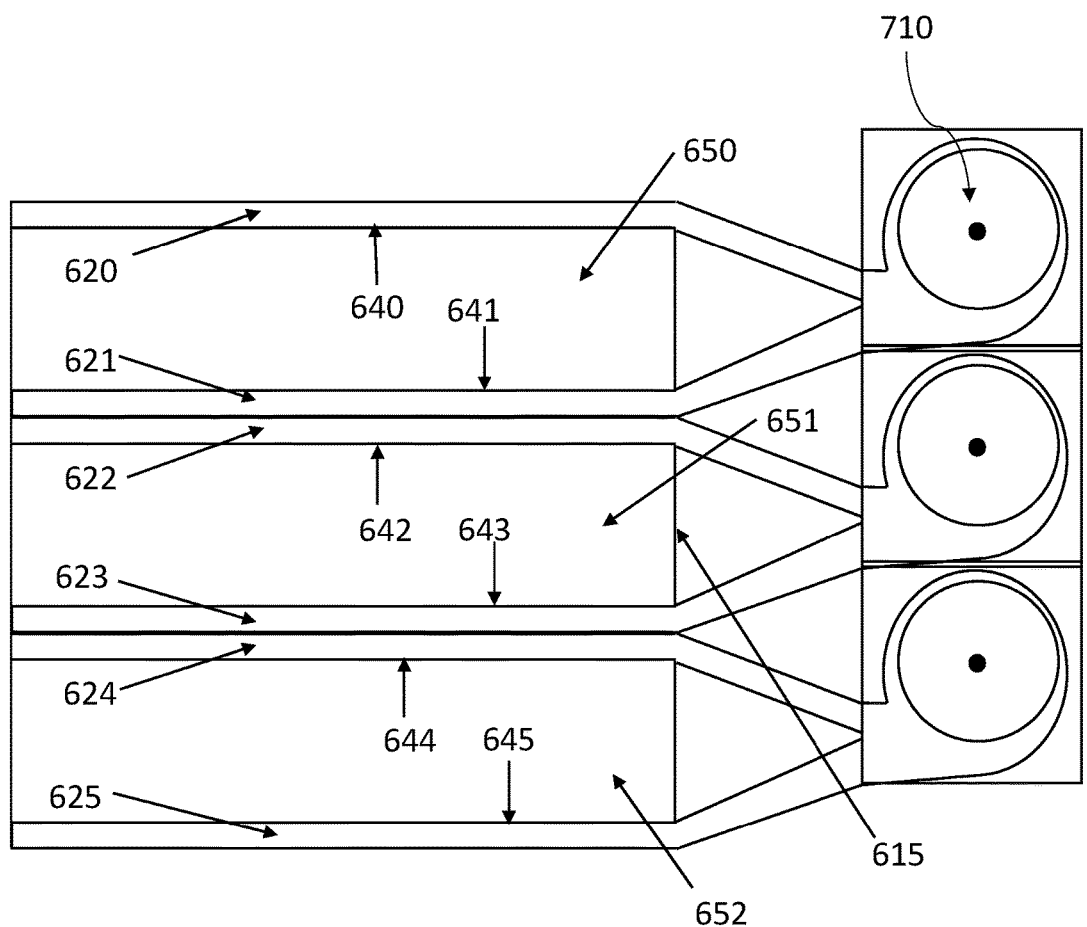
FIG. 7 is a cross-sectional side view of the convection oven from FIG. 6.
Figure 8:
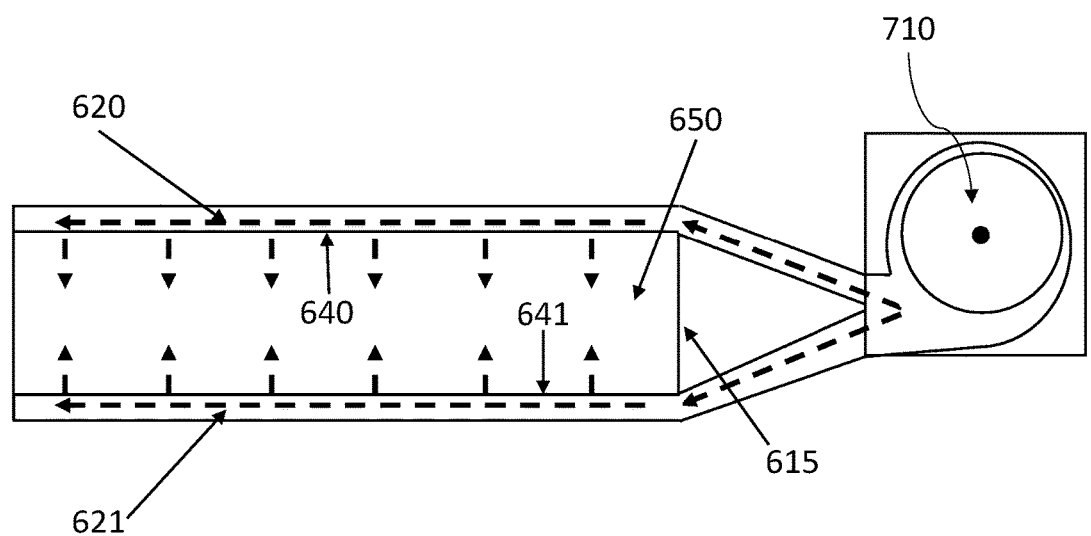
FIG. 8 is a cross-section side view of the convection oven from FIG. 6, depicting air paths in accordance with an exemplary embodiment of the present invention.

FIGS. 6-8 illustrate an example of an oven that uses jet plates comprising structured air inlets to direct air flow into cooking cavities of the oven. Referring now to FIG. 6, there is depicted an isometric view of a convection oven in accordance with an exemplary embodiment of the present invention. As shown, a convection oven 600 includes an oven door 610, a control panel 618 for entering cooking commands or cooking parameters, and an oven cavity defined by a left side wall 612, a right side wall (not shown), a rear wall 615, a top wall (not shown), and a bottom wall (not shown). In FIG. 6, the oven cavity is populated with multiple air plenums 620, 621, 622, 623, 624, 625, which divide the oven cavity into three cooking cavities 650, 651, 652. In some embodiments, some or all of air plenums 620, 621, 622, 623, 624, 625 may be removable and adjacent cooking cavities may be combinable. For example, by removing air plenums 623 and 624, cooking cavities 651 and 652 can be combined into one cooking cavity.

In FIG. 6, a jet plate 640 is disposed along the top of cooking cavity 650 to separate cooking cavity 650 from air plenum 620. A jet plate 641 is disposed along the bottom of cooking cavity 650 to separate cooking cavity 650 from air plenum 621. Similarly, a jet plate 642 is disposed along the top of cooking cavity 651 to separate cooking cavity 651 from air plenum 622. A jet plate 643 is disposed along the bottom of cooking cavity 651 to separate cooking cavity 651 from air plenum 623. Likewise, a jet plate 644 is disposed along the top of cooking cavity 652 to separate cooking cavity 652 from air plenum 624. A jet plate 645 is disposed along the bottom of cooking cavity 652 to separate cooking cavity 652 from air plenum 623.

Referring now to FIG. 7, there is depicted a cross-sectional side view of the oven cavity, illustrating a set of air blower systems and airflow paths within convection oven 600. As shown, air blower systems 710 may be located at the rear of convection oven 600. As also shown, each of air plenums 620, 621, 622, 623, 624, 625 may be connected to rear wall 615 of the oven cavity through an opening (or air channel) to receive airflow from air blower system 710.

Like jet plate 400 shown in FIG. 4, each of jet plates 640, 641, 642, 643, 644, 645 may comprise one or more structured air inlets, such as structured air inlet 200 shown in FIG. 2. Each of jet plates 640, 641, 642, 643, 644, 645 is configured to direct the airflow that the corresponding air plenum 620, 621, 622, 623, 624, 625 received from air blower system 710 to the corresponding cooking cavities 650, 651, 652 through structured air inlets. The structured air inlets in jet plates 640, 642, 644 disposed along the top of cooking cavities 650, 651, 652 direct air downward into the respective cooking cavities, while the structured air inlets in jet plates 641, 643, 645 disposed along the bottom of cooking cavities 650, 651, 652 direct air upward into the respective cooking cavities.

FIG. 8 illustrates the path of airflow from air blower system 710 to cooking cavity 650 through air plenums 620 and 621 and jet plates 640 and 641 in convection oven 600 of FIG. 6, in accordance with an exemplary embodiment of the present invention. As shown, air blower system 710 sends heated air to air plenum 620 above cooking cavity 650 and air plenum 621 below cooking cavity 650 through openings on rear wall 615. The heated air received in air plenum 620 is then directed downward to cooking cavity 650 through the structured air inlets in jet plate 640. The heated air received in air plenum 621 is directed upward to cooking cavity 650 through the structured air inlets in jet plate 641. Once entering cooking cavity 650, the heated air comes into contact with any food item placed on one or more food racks (not shown) within cooking cavity 650. Afterwards, the air within cooking cavity 650 may be drawn towards return air opening(s) on one or more oven cavity walls (not shown) and travel back to air blower system 710.

In some embodiments, structured air inlets in a jet plate can be configured or adjusted in various manners to address forces that can cause unevenness in the air flow distribution within a cooking cavity of a convection oven. This can be done by, for example, adjusting the size of each of hole portions and/or the width of each slot portion in the structured air inlet. The adjustment in the size and dimension of the holes and/or slots can be made within the same structured air inlet and/or across the different structured air inlets in a jet plate.

For example, return air openings on the cavity wall can cause unevenness in the air flow distribution within the cooking cavity because the areas near the return air openings tend to attract more air flow than other areas of the cooking cavity. In some embodiments, to counteract this force and eliminate the unevenness in the air flow distribution, structured air inlets can be configured to have larger holes at the opposite side of the return air openings and smaller holes at the near side of the return air openings.

Another possible cause of unevenness in the air flow distribution within the cooking cavity is a gradient in air pressure within an air plenum of a convection oven. For example, in a convection oven having a narrow cavity width and a correspondingly narrow air plenum with a fan pushing the air from the rear of the air plenum, air pressure can build up at the front of the air plenum. Greater air pressure in the front of the oven forces more air to flow through the air inlets at the front than at the back of the cooking cavity. In some embodiments, to counteract this force and eliminate unevenness in the air flow distribution, structured air inlets can be configured to have larger holes in the back and smaller holes in the front.

Figure 9:
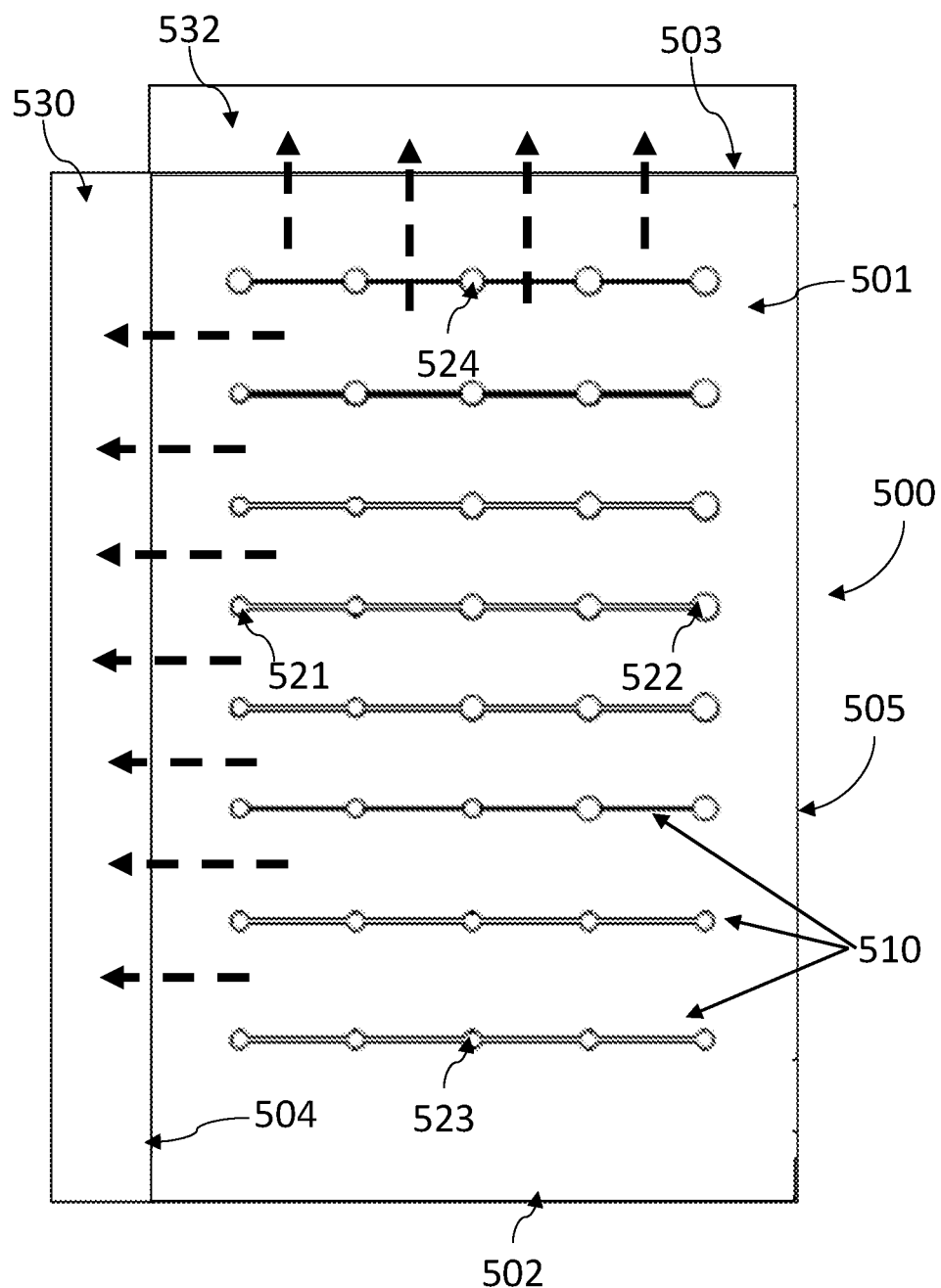
FIG. 9 is a top view of a jet plate comprising a plurality of structured air inlets in accordance with an exemplary embodiment of the present invention.

FIG. 9 provides a top view of a jet plate 500 configured in accordance with an exemplary embodiment of the present invention. In this exemplary embodiment, body 501 of jet plate 500 is disposed along a top wall or a bottom wall of the cooking cavity and comprises a front end 502 disposed proximate to a front of the cooking cavity, a rear end 503 disposed proximate to a rear of the cooking cavity, a left end 504 disposed proximate to a left side of the cooking cavity, and a right end 505 disposed proximate to a right side of the cooking cavity.

In this exemplary embodiment, jet plate 500 comprises a plurality of structured air inlets 510 arranged in a parallel formation. Each of structured air inlets 510 may extend transversely in parallel to a direction from left end 504 to right end 505 of body 501.

FIG. 9 also provides a cross-sectional top view of return air openings 530, 532 located on a left side wall and a rear wall of a cooking cavity. As noted above, return air openings can cause unevenness in the air flow distribution within the cooking cavity because the areas near the return air openings tend to attract more air flow than other areas of the cooking cavity. In this exemplary embodiment, to counteract the force of return air openings 530 on the left side wall of the cooking cavity and eliminate the unevenness in the air flow distribution, structured air inlets 510 can be configured to have larger holes 522 at the opposite side of return air openings 530 and smaller holes 521 at the near side of return air openings.

While not shown in FIG. 9, an air plenum of the oven may be disposed above or below jet plate 500, which is configured to separate the cooking cavity from the air plenum and enable air to be introduced into the cooking cavity from the air plenum. In this exemplary embodiment, structured air inlets 510 are configured to have larger holes 524 in the back and smaller holes 523 in the front to counteract the force arising from a higher air pressure present in the front portion of the air plenum than in the rear portion.

In the exemplary embodiment shown in FIG. 9, the transverse width of body 501 of jet plate 500 from left end 504 to right end 505 may range between 14 inches and 28 inches (e.g., 14.9 inches) and the longitudinal length of body 501 from front end 502 to rear end 503 may range between 19 inches and 23 inches (e.g., 21.0 inches). The diameter of a hole portion in structured air inlets 510 may range between 0.30 inches (e.g., for hole 521 or hole 523) and 0.75 inches (e.g., for hole 522 or hole 524). In addition, the width of a slot portion in structured air inlets 510 may range between 0.07 inches and 0.10 inches, and the length of a slot portion may range between 9.5 inches and 11.0 inches.

As has been described, the present invention provides a convection or combi oven with structured air inlets providing improvement in cooking speed and cooking efficiency and more uniform distribution of air flow within the cooking cavity.

While this invention has been described in conjunction with exemplary embodiments outlined above and illustrated in the drawings, it is evident that many alternatives, modifications and variations in form and detail will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. An oven comprising:
a housing sealable by a door to create a cooking cavity, the cooking cavity providing a lower wall and opposed upper wall separated by vertical sidewalls including a sidewall formed by the door, the upper wall providing an upper plenum receiving air at a plenum entrance and conducting the air to a plurality of openings distributed over a lower surface of the upper plenum;
a blower receiving air from the cooking cavity and blowing the air into the upper plenum for discharge through the openings;
a heater for heating the air before discharge through the openings;
wherein the openings are adapted to produce elongate fans of air diverging along a plurality of horizontally spaced, parallel vertical planes with substantially no overlap between adjacent fans of air within the cooking cavity, each elongate fan extending substantially a full distance between two sidewalls; and
wherein the fans include a set of interconnected columns and sheets of air wherein the columns are adapted to penetrate temperature gradients surrounding food positioned beneath the upper plenum.

2. An oven comprising:
a housing sealable by a door to create a cooking cavity, the cooking cavity providing a lower wall and opposed upper wall separated by vertical sidewalls including a sidewall formed by the door, the upper wall providing an upper plenum receiving air at a plenum entrance and conducting the air to a plurality of openings distributed over a lower surface of the upper plenum;
a blower receiving air from the cooking cavity and blowing the air into the upper plenum for discharge through the openings;
a heater for heating the air before discharge through the openings;
wherein the openings are adapted to produce elongate fans of air diverging along a plurality of horizontally spaced, parallel vertical planes with substantially no overlap between adjacent fans of air within the cooking cavity, each elongate fan extending substantially a full distance between two sidewalls; and
wherein the fans of air are spaced to provide even cooking of food positioned beneath the upper plenum at areas beneath the openings and areas between the openings without movement of the food.

3. An oven comprising:
a housing sealable by a door to create a cooking cavity, the cooking cavity providing a lower wall and opposed upper wall separated by vertical sidewalls including a sidewall formed by the door, the upper wall providing an upper plenum receiving air at a plenum entrance and conducting the air to a plurality of openings distributed over a lower surface of the upper plenum;

a blower receiving air from the cooking cavity and blowing the air into the upper plenum for discharge through the openings;

a heater for heating the air before discharge through the openings;

wherein the openings are adapted to produce elongate fans of air diverging along a plurality of horizontally spaced, parallel vertical planes with substantially no overlap between adjacent fans of air within the cooking cavity, each elongate fan extending substantially a full distance between two sidewalls; and wherein the openings are a set of spaced parallel conduits corresponding to each fan of air, the conduits extending substantially a full distance between two sidewalls.

4. The oven of claim 3 wherein the conduits have a conduit width measured perpendicularly to a length of the conduit being a longest extent of the conduit, and the width of the conduit varies along the length of the conduit to provide columns of air at wider portions of the conduit flanking sheets of air at narrower portions of the conduit.

5. An oven comprising:

a housing sealable by a door to create a cooking cavity, the cooking cavity providing a lower wall and opposed upper wall separated by vertical sidewalls including a sidewall formed by the door, the upper wall providing an upper plenum receiving air at a plenum entrance and conducting the air to a plurality of openings distributed over a lower surface of the upper plenum;

a blower receiving air from the cooking cavity and blowing the air into the upper plenum for discharge through the openings;

a heater for heating the air before discharge through the openings; and wherein the openings are adapted to produce elongate fans of air diverging along a plurality of horizontally spaced, parallel vertical planes with substantially no overlap between adjacent fans of air within the cooking cavity, each elongate fan extending substantially a full distance between two sidewalls;

wherein the openings are a set of spaced parallel conduits corresponding to each fan of air to provide columns of air flanking sheets of air, the conduits extending substantially a full distance between two sidewalls; and wherein the columns of air are adapted to accelerate air of the sheets.

6. The oven of claim 4 wherein the conduits comprise substantially parallel-walled slot segments joining a series of multiple holes distributed along the length of the conduit wherein a width of the holes is larger than a width of the slot segments.

7. The oven of claim 6 wherein a length of the slot segments between the holes is greater than a width of the holes.

8. The oven of claim 6 wherein a number of holes is greater than a number of slot segments.

9. The oven of claim 6 wherein the conduits are substantially straight.

10. The oven of claim 6 wherein the holes are substantially circular.

11. The oven of claim 6 wherein an average width of the conduit decreases with distance from the plenum entrance.

12. The oven of claim 11 wherein the holes decrease in area with distance from the plenum entrance.

13. The oven of claim 6 wherein the width of the slot segments is substantially constant.

14. A jet plate for directing a flow of air into a cooking cavity of an oven, the jet plate comprising:

a body configured to be disposed along a top wall or a bottom wall of the cooking cavity, wherein the body comprises a front end disposed proximate to a front of the cooking cavity, a rear end disposed proximate to a rear of the cooking cavity, and left and right ends disposed proximate respectively to left and right sides of the cooking cavity; and one or more structured air inlets that are openings through the body, each of the structured air inlets comprising a plurality of holes and slots that are alternatingly arranged and serially connected;

wherein the jet plate is configured to separate the cooking cavity from an air plenum of the oven and enable air to be introduced into the cooking cavity from the air plenum.

15. A jet plate for directing a flow of air into a cooking cavity of an oven, the jet plate comprising:

a body configured to be disposed along a top wall or a bottom wall of the cooking cavity, wherein the body comprises a front end disposed proximate to a front of the cooking cavity, a rear end disposed proximate to a rear of the cooking cavity, and left and right ends disposed proximate respectively to left and right sides of the cooking cavity; and one or more structured air inlets that are openings through the body, each of the structured air inlets comprising a plurality of holes and slots that are alternatingly arranged and serially connected;

wherein the body is a substantially rectangular shaped, flat plate.

16. The jet plate of claim 14, wherein each of the structured air inlets extends along a substantially straight line.

17. The jet plate of claim 14, wherein each of the slots comprises two substantially parallel straight edges having substantially equal lengths.

18. The jet plate of claim 14, wherein edges of each of the holes form substantially circular arcs.

19. The jet plate of claim 14, wherein a width of each of the slots is smaller than a diameter of each of the holes.

20. The jet plate of claim 14, wherein a length of each of the slots is greater than a diameter of each of the holes.

21. The jet plate of claim 14, wherein a number of the holes is greater than a number of the slots in at least one of the structured air inlets.

22. The jet plate of claim 14, wherein at least one of the structured air inlets begins with a hole and ends with a hole.

23. The jet plate of claim 14, wherein each of the structured air inlets extends longitudinally in parallel to a direction from the front end of the body to the rear end of the body.

24. The jet plate of claim 14, wherein each of the structured air inlets extends transversely in parallel to a direction from the left end of the body to the right end of the body.

25. The jet plate of claim 14, wherein each of the structured air inlets extends diagonally in parallel to a direction from where the left and front ends of the body meet to where the right and rear ends of the body meet.

26. The jet plate of claim 14, wherein each of the structured air inlets extends diagonally in parallel to a direction from where the right and front ends of the body meet to where the left and rear ends of the body meet.

27. The jet plate of claim 14, wherein all of the structured air inlets are substantially identical in size and dimension.

28. The jet plate of claim 14, wherein the holes in at least one of the structured air inlets are different in size.

29. The jet plate of claim 28, wherein the hole disposed proximate to one of the left and right ends of the body is larger in size than the hole disposed proximate to the other one of the left and right ends of the body in at least one of the structured air inlets.

30. The jet plate of claim 28, wherein the one or more structured air inlets comprise a first structured air inlet disposed proximate to one of the front and rear ends of the body and a second structured air inlet disposed proximate to the other one of the front and rear ends of the body, the holes in the first structured air inlet being larger in size than the holes in the second structured air inlet.

31. The jet plate of claim 14, wherein the one or more structured air inlets comprise two or more substantially parallel structured air inlets and a spacing between adjacent ones of the structured air inlets is configured to avoid a gap or an overlap between coverages of air flows from adjacent structured air inlets on a food product in the cooking cavity.

32. An oven comprising:
a cooking cavity configured to receive a food product;
a blower;
an air plenum configured to receive air from the blower; and a jet plate configured to separate the cooking cavity from the air plenum and direct a flow of the air from the air plenum into the cooking cavity, the jet plate comprising:
a body configured to be disposed along a top wall or a bottom wall of the cooking cavity, wherein the body comprises a front end disposed proximate to a front of the cooking cavity, a rear end disposed proximate to a rear of the cooking cavity, and left and right ends disposed proximate respectively to left and right sides of the cooking cavity; and one or more structured air inlets that are openings through the body, each of the structured air inlets comprising a plurality of holes and slots that are alternatingly arranged and serially connected;
wherein the body is a substantially rectangular shaped, flat plate.

33. The oven of claim 32, wherein each of the structured air inlets extends along a substantially straight line.

34. The oven of claim 32, wherein each of the slots comprises two substantially parallel straight edges having substantially equal lengths.

35. The oven of claim 32, wherein edges of each of the holes form substantially circular arcs.

36. The oven of claim 32, wherein a width of each of the slots is smaller than a diameter of each of the holes.

37. The oven of claim 32, wherein a length of each of the slots is greater than a diameter of each of the holes.

38. The oven of claim 32, wherein a number of the holes is greater than a number of the slots in at least one of the structured air inlets.

39. The oven of claim 32, wherein at least one of the structured air inlets begins with a hole and ends with a hole.

40. The oven of claim 32, wherein each of the structured air inlets extends longitudinally in parallel to a direction from the front end of the body to the rear end of the body.

41. The oven of claim 32, wherein each of the structured air inlets extends transversely in parallel to a direction from the left end of the body to the right end of the body.

42. The oven of claim 32, wherein each of the structured air inlets extends diagonally in parallel to a direction from where the left and front ends of the body meet to where the right and rear ends of the body meet.

43. The oven of claim 32, wherein each of the structured air inlets extends diagonally in parallel to a direction from where the right and front ends of the body meet to where the left and rear ends of the body meet.

44. The oven of claim 32, wherein all of the structured air inlets are substantially identical in size and dimension.

45. The oven of claim 32, wherein the holes in at least one of the structured air inlets are different in size.

46. The oven of claim 45, wherein the hole disposed proximate to one of the left and right ends of the body is larger in size than the hole disposed proximate to the other one of the left and right ends of the body in at least one of the structured air inlets.

47. The oven of claim 45, wherein the one or more structured air inlets comprise a first structured air inlet disposed proximate to one of the front and rear ends of the body and a second structured air inlet disposed proximate to the other one of the front and rear ends of the body, the holes in the first structured air inlet being larger in size than the holes in the second structured air inlet.

48. The oven of claim 32 further comprising one or more return air openings, wherein the holes of the structured air inlets disposed proximate to the one or more return air openings are smaller in size than the holes of the structured air inlets disposed proximate to an opposite side of the one or more return air openings.

49. The oven of claim 32, wherein one portion of the air plenum has a greater air pressure than other portions of the air plenum and the holes of the structured air inlets disposed proximate to the one portion of the air plenum are smaller in size than the holes of the structured air inlets disposed proximate to the other portions of the air plenum.

50. The oven of claim 32, wherein the one or more structured air inlets in the jet plate comprise two or more substantially parallel structured air inlets and a spacing between adjacent ones of the structured air inlets is configured to avoid a gap or an overlap between coverages of air flows from adjacent structured air inlets on the food product in the cooking cavity.

51. An oven comprising:
a cooking cavity comprising a horizontal portion for placing a food product;
an air plenum for providing an air to the cooking cavity; and
a jet plate configured to direct flows of the air from the air plenum into the cooking cavity, the jet plate comprising:
an air impermeable body disposed substantially horizontally along a top of the cooking cavity, and
air inlets comprising openings through the body,
wherein a shape and a dimension of each of the air inlets, a spacing between two adjacent ones of the air inlets, and a vertical distance between the jet plate and the horizontal portion of the cooking cavity are configured to provide a substantially even coverage of the air flows over the horizontal portion with substantially no gap or overlap in the coverage by the air flows from the two adjacent ones of the air inlets, and
wherein the air inlets are adapted to produce elongate fans of air to provide a set of interconnected columns and sheets of air wherein the columns are adapted to penetrate temperature gradients surrounding food positioned beneath the upper plenum.

52. An oven comprising:
a cooking cavity comprising a horizontal portion for placing a food product;
an air plenum for providing an air to the cooking cavity; and
a jet plate configured to direct flows of the air from the air plenum into the cooking cavity, the jet plate comprising:
an air impermeable body disposed substantially horizontally along a top of the cooking cavity, and
air inlets comprising openings through the body,
wherein a shape and a dimension of each of the air inlets, a spacing between two adjacent ones of the air inlets, and a vertical distance between the jet plate and the horizontal portion of the cooking cavity are configured to provide a substantially even coverage of the air flows over the horizontal portion with substantially no gap or overlap in the coverage by the air flows from the two adjacent ones of the air inlets, and
wherein the air inlets are adapted to produce elongate fans of air spaced to provide even cooking of food positioned beneath the air plenum at areas beneath the air inlets and areas between the air inlets without movement of the food.

53. An oven comprising:
a cooking cavity comprising a horizontal portion for placing a food product;
an air plenum for providing an air to the cooking cavity; and
a jet plate configured to direct flows of the air from the air plenum into the cooking cavity, the jet plate comprising:
an air impermeable body disposed substantially horizontally along a top of the cooking cavity, and
air inlets comprising openings through the body,
wherein a shape and a dimension of each of the air inlets, a spacing between two adjacent ones of the air inlets, and a vertical distance between the jet plate and the horizontal portion of the cooking cavity are configured to provide a substantially even coverage of the air flows over the horizontal portion with substantially no gap or overlap in the coverage by the air flows from the two adjacent ones of the air inlets,
wherein the air inlets are adapted to produce elongate fans of air and the air inlets are a set of spaced parallel conduits corresponding to each fan of air, the conduits extending substantially a full distance between two sidewalls.

54. An oven comprising:
a cooking cavity comprising a horizontal portion for placing a food product;
an air plenum for providing an air to the cooking cavity; and
a jet plate configured to direct flows of the air from the air plenum into the cooking cavity, the jet plate comprising:
an air impermeable body disposed substantially horizontally along a top of the cooking cavity, and
air inlets comprising openings through the body,
wherein a shape and a dimension of each of the air inlets, a spacing between two adjacent ones of the air inlets, and a vertical distance between the jet plate and the horizontal portion of the cooking cavity are configured to provide a substantially even coverage of the air flows over the horizontal portion with substantially no gap or overlap in the coverage by the air flows from the two adjacent ones of the air inlets,
wherein the air inlets are adapted to produce elongate fans of air and the air inlets are a set of spaced parallel conduits corresponding to each fan of air to provide columns of air flanking sheets of air, the conduits extending substantially a full distance between two sidewalls, and
wherein the columns of air are adapted to accelerate air of the sheets.

* * * * *